April 21, 1953     I. LEVENSTEIN     2,635,877
RACE GAME APPARATUS

Filed Nov. 9, 1950                                3 Sheets-Sheet 1

INVENTOR
ISRAEL LEVENSTEIN, DECEASED,
BY J. GOLDBERG & C.A. SKLAR
EXECUTORS

BY
ATTORNEY.

April 21, 1953 I. LEVENSTEIN 2,635,877
RACE GAME APPARATUS
Filed Nov. 9, 1950 3 Sheets-Sheet 2
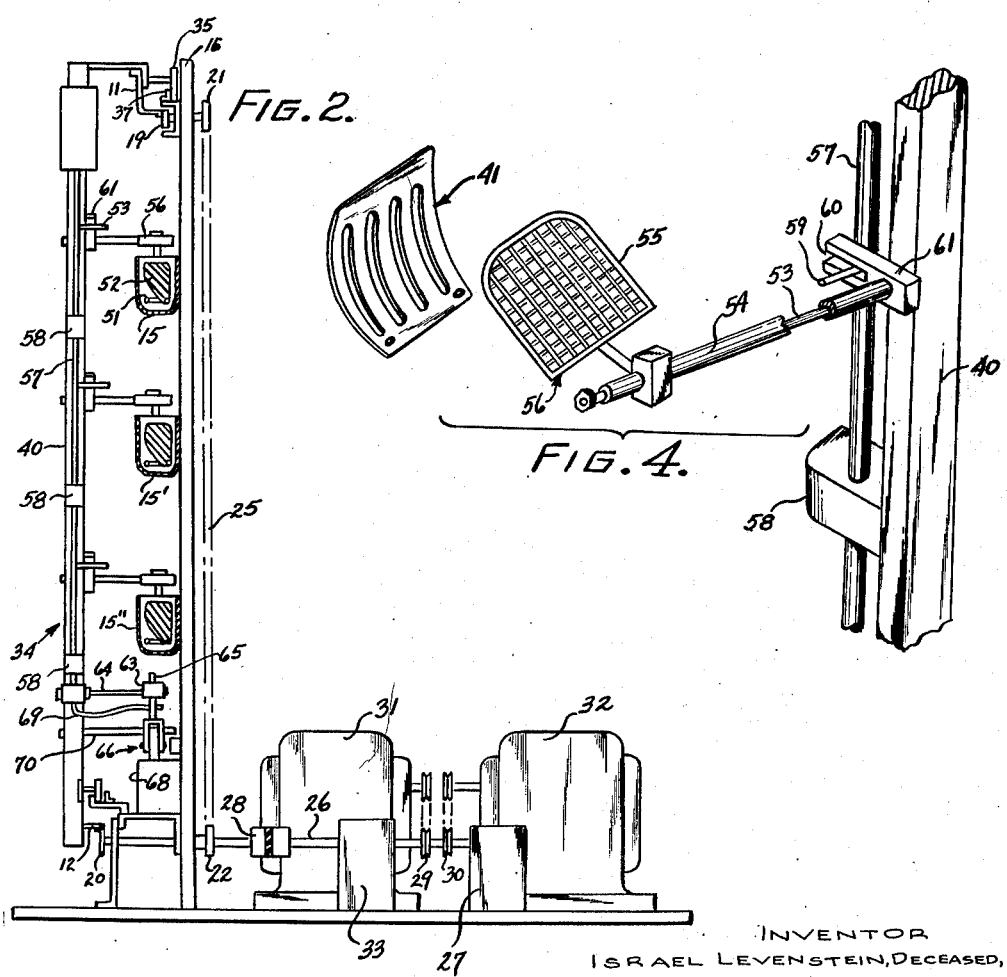
INVENTOR
ISRAEL LEVENSTEIN, DECEASED,
BY J. GOLDBERG & C.A. SKLAR
EXECUTORS
BY 
ATTORNEY April 21, 1953      I. LEVENSTEIN      2,635,877
RACE GAME APPARATUS Filed Nov. 9, 1950      3 Sheets-Sheet 3

INVENTOR
ISRAEL LEVENSTEIN, DECEASED,
By J. GOLDBERG & C. A. SKLAR
EXECUTORS

BY
ATTORNEY

Patented Apr. 21, 1953

2,635,877

UNITED STATES PATENT OFFICE 2,635,877

RACE GAME APPARATUS

Israel Levenstein, deceased, late of New York, N. Y., by Joseph Goldberg, New York, and Carol Ann Sklar, Belle Harbor, N. Y., executors Application November 9, 1950, Serial No. 194,766

6 Claims. (Cl. 272—4)

The present invention relates to fish race apparatus, and more particularly to the type in which live fish are employed.

An object of this invention is to provide an apparatus of the character mentioned, of novel and improved construction, wherein the fish during the period of the race, are free to move as they desire, yet the persons in the contest can in a manner attempt to control the movements of their respective entries to urge them towards the goal. These urging efforts may even cause the fish to perform differently than is desired, thereby making it a game which is extremely interesting, exciting and stimulating and for some of the players quite provoking, however all in fun for the contestants and spectators and always informative as to fish habits and behavior.

Another object of this invention is to provide a fish race apparatus of novel and improved construction, utilizing but a single member in each transparent trough raceway, which serves as a starting gate, raceway cleaner and means to push the fish back to start position, after a race is finished.

Another object hereof is to provide a race apparatus of novel and improved construction, for racing fish or insects or other living things capable of self-locomotion, always protected from being harmed by any moving parts of the mechanism; all said parts having automatically limited movements.

Another object hereof is to provide a novel and improved game apparatus of the type described, which is easy to understand, easy to play and efficient in carrying out the purposes for which it is designed.

Other objects and advantages will become apparent as this disclosure proceeds.

In the accompanying drawings forming part of this specification, similar characters of reference indicate corresponding parts in all the views.

Fig. 2 is a section taken at lines 2—2 in Fig. 1. Substantially, this view is a side view of Fig. 1 including driving mechanism not shown in Fig. 1.

Fig. 3 is a top plan view of mechanism within a raceway; the raceway itself being omitted to attain clarity of illustration.

Fig. 4 is a fragmentary perspective view of one of what may be called a fish returning member, together with associated components as well as one of the goal members, of which there is one in each raceway trough. Said fish return- ing member has other important functions as will be explained. This Fig. 4 is as seen from behind the raceway and is so shown in order to attain clarity of illustration.

Figure 5:
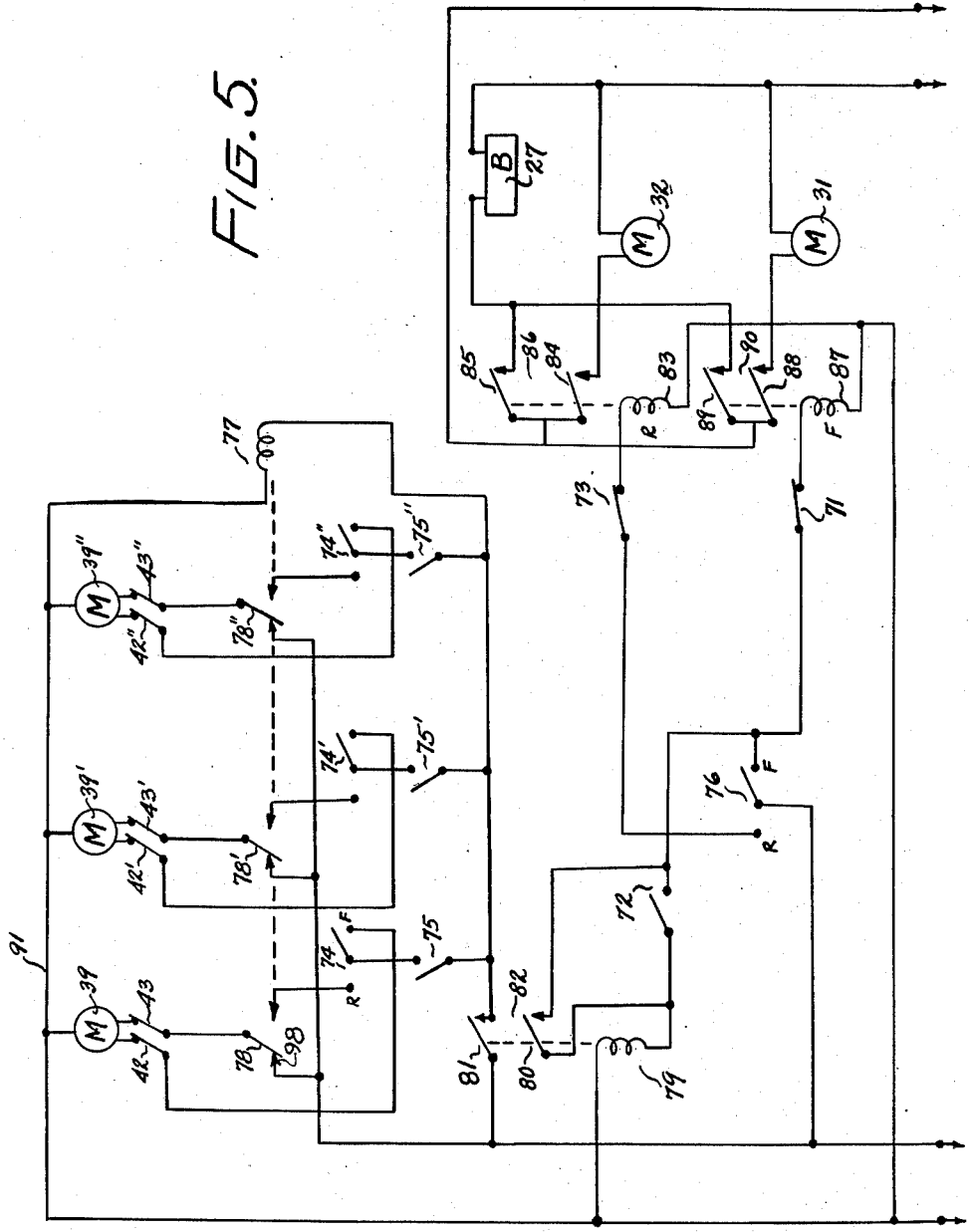

Fig. 5 is a wiring diagram of the electrical circuit which may be employed for the operation of this apparatus.

In the drawings, the numerals 15, 15' and 15" designate raceways which are troughs made of glass, Lucite or other suitable material preferably transparent, closed at the ends so that they may hold water for a live fish in each of them. These raceways are mounted horizontally in spaced relation on an upright board 16, or on other suitable framework. All incidents of structure of said raceways being identical, parts related to raceway 15 will be designated by whole numbers. Corresponding parts associated with the raceway 15' will be designated by similar numbers prime, and those associated with the raceway 15" will be designated by similar numbers double prime. So what is said for the raceway 15 shall all be deemed the same for the other raceways.

The numerals 17 and 18 denote horizontally positioned endless chains on sprockets 19 and 20 respectively; the sprocket 19 being on the same shaft with a sprocket 21, and the sprocket 20 being on the shaft 26 with a sprocket 22. The sprockets 23 and 24 are idlers. The sprockets 21 and 22 are connected by an endless chain 25. Shaft 26 is controlled by an electro-magnetically operated brake 27, normally holding the shaft 26 when not actuated, but releasing its hold on said shaft, when actuated. Interposed in said shaft 26, is what is commonly known as a slip clutch 28. Said shaft also carries the pulleys 29 and 30; one being connected by a belt to motor 31, and the other being connected by a belt to the motor 32; the slip clutch 28, being between said pulleys and the sprocket 22. A reduction gear box 33 may also be interposed in said shaft 26 between said pulleys and the slip clutch.

Shown forward of the raceways is a carriage designated generally by the numeral 34 associated with framework on which are mounted the trolley rollers 35 and 36, positioned for movement on tracks 37 and 38 respectively. The carriage is secured to the upper strands of both chains 17 and 18 by the elements 11 and 12 respectively, so that bar 40 of said carriage will be vertical at any rest position and during movement of the chains 17 and 18, upon rotation of the shaft 26.

What is hereinafter referred to as forward movement shall be deemed movement towards the goal 41 at the right hand side of the raceways, and what is referred to as reverse movement shall be deemed movement towards the starting end at the left hand side of the raceways, adjacent which is mounted an electric motor 39 on which two switches 42 and 43 are mounted, whose respective operating arms 44 and 45 project to nearly the bottom of the raceway within the latter. The motor shaft 46 of motor 39 is vertical, extends into the raceway and carries a pulley 47 near the bottom of the raceway. A slip clutch 48 is interposed in this shaft 46. The goal piece 41 is a perforated metal sheet partitioning the raceway a short distance from the closed right hand end, and presents a concave quadrant surface facing the starting end of the raceway. In the space within the raceway, between the goal member 41 and raceway end, is a vertical shaft 49, carrying a pulley 50 near the raceway's bottom. An endless cable 51 is mounted on the pulleys 47 and 50, and passes through clearance holes in the goal member 41 and in the respective switch operating arms 44 and 45, one strand of said cable through each of said operating arms respectively, namely the strand 152 through the operating arm 44 and the strand 151 through the operating arm 45. A lure 52 in the shape of a fish or other form as may be desired is secured to cable strand 151, and is of a size to nearly fill the cross section of the raceway's interior.

Above each raceway, the carriage bar 40 has a fixed rod 53 extending across the raceways respectively. This rod carries a tube 54 which is free for axial rotation thereon and for some longitudinal movement therealong. Extending laterally from this tube is a perforated thin plate member 56, having a rubber edging 55 which contacts and wipes the raceway interior surface, when said plate member is swung into the raceway to partition the latter, and the carriage 34 is moved.

A vertically positioned rod 57, longitudinally slidably mounted in brackets 58 extending from the carriage bar 40, has a fixed pin extending towards the raceways, one at each raceway. Such pin associated with the raceway 15 is designated by the numeral 59, and extends within the slot 60 of an arm 61 extending laterally from and fixed on the tube 54. It is evident that reciprocatory movement imparted to the rod 57, will cause the members 56, 56' and 56'' to be swung into and out of the raceways respectively. Dimensions and extent of movement are such that when inside the raceway, the member 56 is in a vertical plane partitioning the raceway, and when raised is substantially horizontal above the raceway; the latter condition being shown in Fig. 1.

A block 62 is fixed at the bottom end of rod 57, extending towards the goal end of the frame board 16. An arm 63 extends from said block in said mentioned direction, and is pivoted thereto at 64. The shank 65 of a roller caster 66 is fixed near the free end of said arm 63, with roller 67 extending downwardly for contact with cam member 68. A rigid element 69 extends fixed from the block 62, and acts as a stop for the shank 65 when the said shank is upright, however permitting counter-clockwise movement of arm 63 about pivot point 64.

The carriage bar 40 carries a fixed arm 70, which during carriage travel, contacts the operating arms respectively, of the normally closed micro-switch 71 to open said switch 71, also of the normally open micro-switch 72 to momentarily close said switch 72, and of the normally closed micro-switch 73 to open said switch 73. Upon the opening of switch 71, current is cut off from the motor 31 which drives the carriage 34 towards the goal end of the raceways. Upon opening of the switch 73, current is cut off from the motor 32 which drives the said carriage towards the starting end of the raceways. Upon momentarily closing of the switch 72, the players' motors 39, 39' and 39'' can be operated by the players' switches 74, 74' and 74'' respectively. Each of the players' switches is a single pole double throw switch arranged on a table or the like, in front of the game board 16, at which table (not shown) the players take their respective positions. As soon as a player takes a position, the attendant manually closes the switch 75 or that akin thereto at such occupied position. The attendant also manually controls the main switch 76, which is a single pole double throw switch to operate the carriage movement. Switch 76 is so placed that its movement to a contact position is analogous to the direction of the carriage movement effected. The players' switches of the class 74 are so placed that movement of the operating members thereof respectively, are analogous to the direction of movement of the lures as the players intend.

The numeral 77 designates a relay having one armature as 78 for each of the players' motors respectively; each such armature being a single pole of a double throw switch respectively. All said armatures of relay 77 move alike. The numeral 79 denotes a relay having two armatures 80 and 81, which may be deemed the double pole of a single throw switch 82. The numeral 83 designates a relay having two armatures 84 and 85 which may be deemed the double pole of a single throw switch 86. The numeral 87 denotes a relay having two armatures 88 and 89 which may be deemed the double pole of a single throw switch 90.

Each strand of the cable 51 has secured thereon some means to operate the switches 42 and 43 respectively, a little before the lure 52 assumes its terminal positions with respect to the raceways. Such means may be the bead 91 on strand 151, the lure 52 on strand 152, or in place of the latter, a bead 92 on the latter strand, if said lure is not to be used as part of said mentioned means. The function of said beads or the like is to intercept and shift the operating members 44 and 45 respectively to open said switches. Switch 43 is opened by bead 92, while switch 42 is opened by bead 91, at start and goal positions of the lure 52.

At the start, positions of the various components of the apparatus are as follows. The carriage 34 is slightly ahead of the lure 52 near the starting end of the raceways. Button 92 holds the switch 43 in open condition. Button 91 is near the goal position. The switches 42, 71 and 73 are in closed condition. Switch 72 is in open condition. The attendant's main switch 76 and the switches akin to 75 are in open condition. None of the relays is actuated. All motors are at rest. The roller 67 is on surface 93, off the cam 68, ready to climb surface 14 of said cam. Due to gravity, or the action of springs not shown, the rod 57 has slid downward, and members 56 are in their respective raceways, in vertical position, as partitioning vanes therein respectively, acting as gates.

Also at the start condition, all switches akin to players' control switch 74, are closed at their respectively associated R marked switch point. The attendant drops a live fish, as for instance a gold fish 95, into each of the raceways, ahead of the lures but blocked by the vane members 56 acting as gates. Players now take their positions at the players' control switches. All switches akin to 75 are closed by the attendant at all player-occupied positions only. These last mentioned switches are actually near the main switch 76, which the attendant now closes at F, whereupon the relay 87 is actuated, closing the switch 90. Motor 31 will operate to move the carriage 34 from the adjustable stops 96 at starting position, towards the adjustable stops 97 at goal position. The brake 27 is energized automatically to release hold of the drive shaft 26, upon excitation of either motor. All players' motors as 39 remain inactive until the switch 72 is momentarily closed when the bar 70 passes said switch as the carriage 34 travels towards the goal.

The players manipulate their respective switches akin to 74 so that the motors as 39 that they control shall rotate in forward or reverse directions to similarly move the lure as 52 for urging the fish 95 to swim towards the goal piece 41. The players' motors as 39 are of the reversible type, which run in one direction when current is applied to its terminals connected to conductor 91 and the switch 42, or in the reverse direction when current is applied to conductor 91 and the motor's terminal connected to switch 42.

Figure 1:
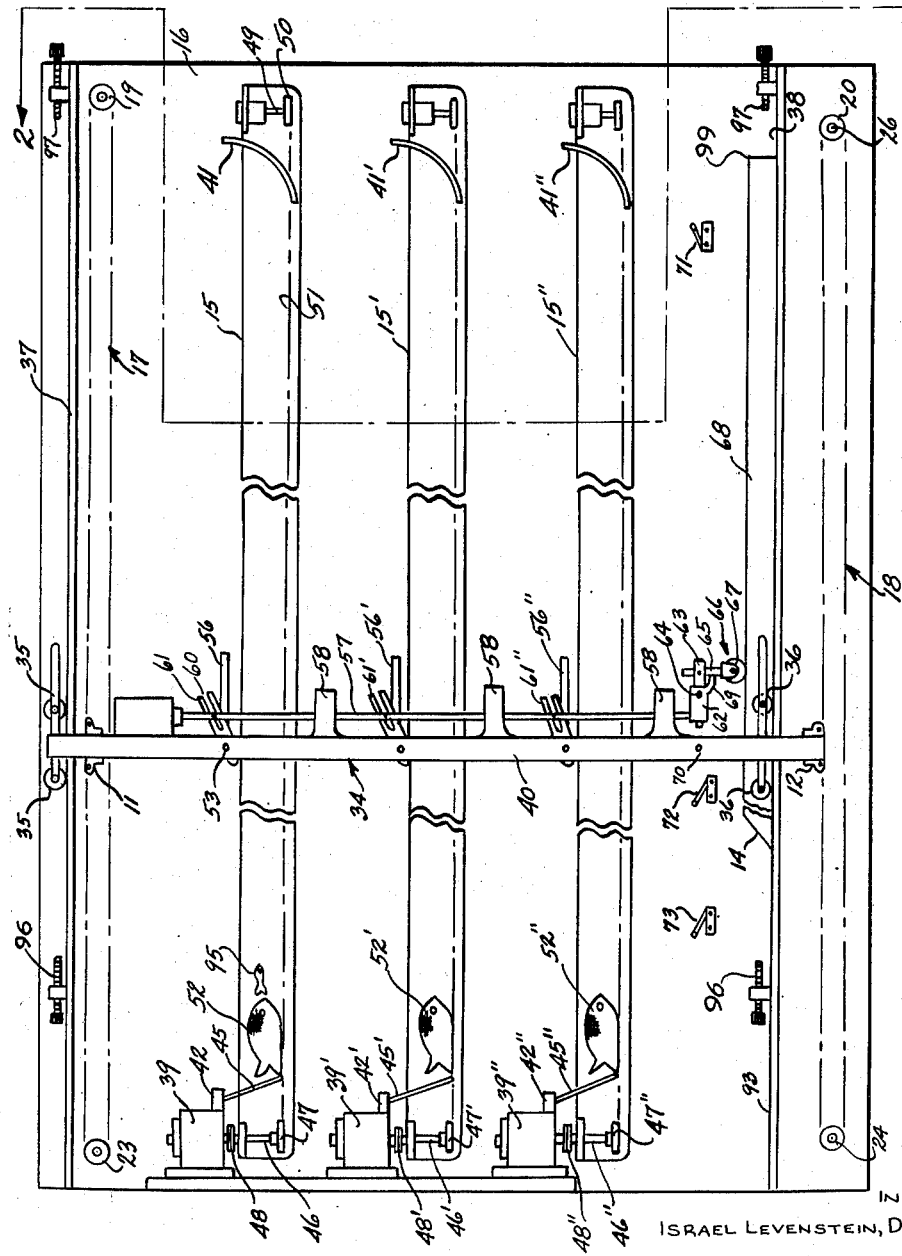
Fig. 1 is a front view of a game apparatus embodying the teachings of this invention. Some parts in this view are shown diagrammatically.

The movement of the carriage 34 towards goal position is comparatively rapid and, as it so travels, the roller 67 rides up the slant surface 14 and thence onto the horizontal top surface of the cam 68, whereupon the rod 57 will be raised, and hence all vane members 56 will be swung upward and out of the raceways to horizontal position above said raceways as shown in Fig. 1. The fish 95 now have free access to swim to the goal. As soon as the switch 72 is momentarily closed, the relay 79 becomes energized, closing switch 82 which remains closed until the attendant opens the main switch 76. It is to be noted that the closing of the switch 82 causes the actuation of the relay 77, until which time, the motors as 39 could only be run for return movement of the lures 52.

The raceways are identified by numeral or otherwise, and corresponding notations mark the players' switches 74. As the respective fish reach the goal, the attendant announces by calling in succession the raceway identification numerals in which the fish have reached the goal first, second and so on, until all or a lesser number than all of the fish reach the goal, whereupon he sets the main switch into reverse position.

It is to be noted that when the carriage 34 approaches the goal, arm 70 will cause switch 71 to become momentarily opened, thereby deenergizing the relay 87, whereupon switch 90 will be opened and motor 31 will come very soon to rest. At any rate, as its momentum lessens, the drive shaft 26 will stop very soon after current is cut off from motor 31, due to the slipping action of the slip clutch 28.

During the carriage movement to the goal, the shank 65 carrying the roller 67 will be vertical and against stop element 69, because the force action on member 63 will be for counterclockwise movement about axis 64. When the said roller 67 reaches the drop 99 at the end of the cam 68, rod 57 will fall, and the vanes as 56 will be swung downward to vertical position as partitions within the respective raceways. Such swinging movement is set to begin so that the vanes wipe the concave surfaces of the goal pieces 41 respectively, and if any of the fish 95 had already arrived at the goal piece 41, it will be moved backward in the raceway. If such swinging action entering the vanes into the raceway occurs before any of the fish arrive at the goal, said vanes thereafter serve as the goal.

At the end of the race when the attendant sets the main switch 76 into reverse position at its terminal marked R, the relay 83 becomes energized, closing thereby the switch 86. Brake 27 releases its hold on the drive shaft 26, and motor 32 operates to return the carriage 34 to starting position.

Upon return movement of the carriage, the roller 67 when it hits surface 99 of the cam 68, will cause arm 63 to move counterclockwise, and the rod 57 will remain in its lowered position and hence the vanes 56 will remain in their lowered position within the raceways, until the carriage 34 is again given forward movement and shank 65 is made upright when the roller 67 again moves up on cam surface 14, and said shank 65 is up against the stop member 67. During return movement of the carriage, it is evident that the rubber edging 55 of the vanes 56 will wipe the raceway interiors clean, and that said vanes will push the fish 95 back to start position.

As soon as the master switch 76 is opened, and while it is closed for reverse, meaning return movement of the carriage, the relay 79 is inactive, and likewise relay 77 is inactive. However, the armatures as 78, coming back into contact with contact point 98, close the circuit of the players' motors for return of the lures, and stop when switch 43 is opened by bead 92.

In the return movement of the carriage 34, arm 70 will cause switch 73 to become opened, thereby deenergizing the relay 83, whereupon switch 86 will be opened and motor 32 will come very soon to rest. Anyhow, as its momentum decreases, the drive shaft 26 will stop very soon after current is cut off from motor 32, due to the slipping action of the slip clutch 28.

The return of the carriage to start position should be slow, and the motor 32 is so chosen, and is of sufficient power to have the wiping accomplished. Slow return movement of the carriage is also desirable so as to avoid spilling water out of the raceways, and avoid any hurt to the fish.

The players' motors 39 and all relays are operated by a current of small voltage, say 10 or twelve volts, while the motors 31 and 32 are operated from commercial power lines.

When the carriage 34 has returned to start position, the attendant opens the switch 76 and the switches akin to 75. The switches 74 of the players are set in position for reverse movement of the players' motors, and the game apparatus is ready for the next race.

The water in the raceways is of course dispensed with when the racers do not require same or where water would be detrimental.

This invention is capable of numerous forms and various applications without departing from the essential features herein disclosed. It is therefore intended and desired that the embodiment shown herein shall be deemed illustrative and not restrictive and that the patent shall cover all patentable novelty herein set forth; reference being had to the following claims rather than to the specific description herein, to indicate the scope of this invention.

The claims are:

1. In a race game apparatus, a raceway having a floor and longitudinal walls from its starting end to its goal end; said raceway being adapted for a body capable of self-locomotion to move along therein, a carriage mounted for movement along substantially the full length of the raceway, means to move the carriage along the raceway, a vane carried on the carriage and movable to a first position within the raceway to partition the latter and serve as a gate at the starting end of the raceway ahead of the starting position for said body, and to serve as a means to push said body in the raceway, away from the goal end to the starting end of the raceway upon return movement of the carriage; said vane being movable also to a second position whereby said raceway is unobstructed for movement of said body therealong and means to move said vane from one position to the other, automatically controlled by the movement of the carriage along the raceway, whereby said vane is moved to clear the raceway at about commencement of movement of the carriage away from the starting end of the raceway, and then back into the raceway to partition same substantially from the time the carriage reaches its limit of travel towards the goal end of the raceway and returns to its limit of travel towards the starting end of the raceway and until the carriage again commences to move towards the goal end of the raceway.

2. A race game apparatus as defined in claim 1, wherein the locus of movement of the vane between its limit positions on the carriage, determines an arc of concave surface towards the starting end of the raceway, commencing substantially from the floor of the raceway.

3. A race game apparatus as defined in claim 1, including a member positioned at the goal end of the raceway, presenting a concave surface towards the starting end of the raceway, commencing substantially from the floor of the raceway and wherein the locus of movement of the vane between its limit positions on the carriage, determines a similar arc, whereby on movement of the vane into the raceway when at the goal end of the raceway, said vane will wipe said concave surface of said member positioned at the goal end of the raceway.

4. A race game apparatus as defined in claim 1, wherein the means to move the carriage includes a two speed device adapted to move the carriage towards the goal end of the raceway at a comparatively high rate of speed and towards the starting end of the raceway at a comparatively slow rate of speed.

5. A race game apparatus as defined in claim 1, wherein the means to move the vane from one position to another on the carriage, includes a cam means to move the vane to clear the raceway for free passage of the mentioned body along the raceway, at about the commencement of movement of the carriage towards the goal end of the raceway and maintain said vane in such position during movement of the carriage until about when said carriage reaches the goal position, and then to move said vane in position to partition the raceway and maintain it so until the carriage again moves from its rest position at the start end of the raceway towards the goal end of the raceway.

6. A race game apparatus as defined in claim 1, wherein the raceway includes transparent material along it so that the interior of the raceway is visible and wherein the perimeter of the vane is provided with a resilient edging which contacts the raceway interior and wipes same when the vane partitions the raceway and the carriage is in motion.

JOSEPH GOLDBERG,
CAROL ANN SKLAR.
*Executors of the last will and testament of Israel Levenstein, deceased.*

References Cited in the file of this patent
UNITED STATES PATENTS

| Number | Name | Date |
|---|---|---|
| 1,984,452 | Ballew | Dec. 18, 1934 |
| 2,330,899 | Levenstein | Oct. 5, 1943 |
| 2,526,215 | Florimont | Oct. 17, 1950 |